United States Patent
Minden (10) Patent No.: US 7,831,113 B1
(45) Date of Patent: Nov. 9, 2010

(54) OPTICAL PULSE POSITION MODULATOR WITH CHIRP COMPENSATION

(75) Inventor: Monica Minden, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 216 days.

(21) Appl. No.: 12/248,667

(22) Filed: Oct. 9, 2008

Related U.S. Application Data (60) Provisional application No. 60/981,062, filed on Oct. 18, 2007.

(51) Int. Cl.
*G02F 1/295* (2006.01)
*H04B 10/04* (2006.01)

(52) U.S. Cl. ............ 385/8; 385/1; 385/2; 385/37; 398/189

(58) Field of Classification Search ............ 385/1, 385/2, 3, 24, 8, 27, 42, 31, 37, 129, 130, 385/131, 132, 14; 398/81, 83, 84, 87, 147, 398/158, 189, 190, 191, 198, 199, 200
See application file for complete search history.

(56) References Cited

U.S. PATENT DOCUMENTS

| | | | | |
|---|---|---|---|---|
| 5,113,278 A | * | 5/1992 | Degura et al. ............ | 398/199 |
| 5,878,071 A | * | 3/1999 | Delavaux .................. | 372/94 |
| 5,915,051 A | * | 6/1999 | Damask et al. ............ | 385/16 |
| 6,466,703 B1 | * | 10/2002 | Ionov ....................... | 385/10 |
| 6,640,020 B2 | * | 10/2003 | Ionov ....................... | 385/10 |
| 6,943,925 B1 | * | 9/2005 | Islam ........................ | 359/108 |
| 7,142,789 B1 | * | 11/2006 | Weiner et al. ............ | 398/201 |
| 7,444,049 B1 | | 10/2008 | Kim et al. ................. | 385/37 |
| 2003/0048971 A1 | * | 3/2003 | Ionov ....................... | 385/10 |
| 2003/0123794 A1 | * | 7/2003 | Chowdhury et al. ....... | 385/37 |
| 2003/0133686 A1 | * | 7/2003 | Delrosso et al. ......... | 385/135 |
| 2003/0152322 A1 | | 8/2003 | Smith et al. .............. | 385/27 |

OTHER PUBLICATIONS

U.S. Appl. No. 11/952,861, filed Dec. 7, 2007, Minden, Monica.

* cited by examiner

*Primary Examiner*—Brian M Healy
(74) *Attorney, Agent, or Firm*—Ladas & Parry (57) ABSTRACT

An optical pulse position modulator includes a substrate with parallel first and second sides, the substrate including a first waveguide channel and a parallel second waveguide channel orthogonal to the first and second sides, a linear chirped grating orthogonal to and upon the first and second waveguide channels, and at least a first electrode along the first waveguide channel to apply a voltage modulation thereto. A first optical circulator has a first port coupled to a pulsed optical carrier signal, and a second port coupled to the first waveguide channel on the first side of the substrate, and a second optical circulator has a fourth port coupled to the third port of the first optical circulator, and a fifth port coupled to the second waveguide channel on the second side of the substrate. An output of the second waveguide channel is a position modulated optical pulse signal.

28 Claims, 6 Drawing Sheets

FORMING A SUBSTRATE HAVING SUBSTANTIALLY PARALLEL FIRST AND SECOND SIDES, THE SUBSTRATE INCLUDING
    A FIRST WAVEGUIDE CHANNEL ORTHOGONAL TO THE FIRST AND SECOND SIDES,
    A SECOND WAVEGUIDE CHANNEL PARALLEL TO THE FIRST WAVEGUIDE CHANNEL,
    A LINEAR CHIRPED GRATING ON THE SUBSTRATE AND ORTHOGONAL TO THE FIRST AND SECOND WAVEGUIDE CHANNELS,
    A FIRST ELECTRODE ALONG THE FIRST WAVEGUIDE CHANNEL, AND
    A SECOND ELECTRODE ALONG THE FIRST WAVEGUIDE CHANNEL   100

PROVIDING A FIRST OPTICAL CIRCULATOR HAVING A FIRST PORT, A SECOND PORT AND A THIRD PORT, THE FIRST PORT COUPLED TO A PULSED OPTICAL CARRIER SIGNAL, AND THE SECOND PORT COUPLED TO THE FIRST WAVEGUIDE CHANNEL ON THE FIRST SIDE OF THE SUBSTRATE   102

PROVIDING A SECOND OPTICAL CIRCULATOR HAVING A FOURTH PORT, A FIFTH PORT AND A SIXTH PORT, THE FOURTH PORT COUPLED TO THE THIRD PORT OF THE FIRST OPTICAL CIRCULATOR, AND THE FIFTH PORT COUPLED TO THE SECOND WAVEGUIDE CHANNEL ON THE SECOND SIDE OF THE SUBSTRATE   104

APPLYING A VOLTAGE MODULATION BETWEEN THE
FIRST AND SECOND ELECTRODES TO POSITION
MODULATE THE PULSED OPTICAL CARRIER SIGNAL
TO PRODUCE A DISPERSED POSITION MODULATED
OPTICAL PULSE SIGNAL WHICH IS COUPLED VIA THE
SECOND, THIRD, FOURTH AND FIFTH PORTS TO THE — 106
SECOND WAVEGUIDE CHANNEL

COMPRESSING THE DISPERSED POSITION
MODULATED OPTICAL PULSE SIGNAL IN THE SECOND
WAVEGUIDE CHANNEL TO PRODUCE A POSITION
MODULATED OPTICAL PULSE SIGNAL AT THE SIXTH
PORT ON THE SECOND OPTICAL CIRCULATOR — 108

FIG. 4B

| APPLYING A PULSED OPTICAL SIGNAL TO A FIRST WAVEGUIDE CHANNEL ON A SUBSTRATE, THE FIRST WAVEGUIDE CHANNEL HAVING A FIRST LINEAR CHIRPED GRATING TO DISPERSE THE SIGNAL | 120 |

| APPLYING A MODULATED VOLTAGE BETWEEN FIRST AND SECOND ELECTRODES ALONG THE FIRST WAVEGUIDE CHANNEL TO POSITION MODULATE THE DISPERSED PULSED OPTICAL SIGNAL TO PRODUCE A DISPERSED POSITION MODULATED OPTICAL PULSE SIGNAL | 122 |

| APPLYING THE DISPERSED POSITION MODULATED OPTICAL PULSE SIGNAL TO A SECOND WAVEGUIDE CHANNEL ON THE SUBSTRATE, THE SECOND WAVEGUIDE CHANNEL HAVING A SECOND LINEAR CHIRPED GRATING MATCHED TO THE FIRST WAVEGUIDE CHANNEL TO REVERSE THE SIGNAL DISPERSION TO PRODUCE A POSITION MODULATED OPTICAL PULSE SIGNAL | 124 |

FIG. 5

OPTICAL PULSE POSITION MODULATOR WITH CHIRP COMPENSATION

STATEMENT REGARDING FEDERALLY SPONSORED RESEARCH OR DEVELOPMENT

The present invention was made with support from the United States Government under contract NRO000-05-C-0044 awarded by the National Reconnaissance Organization. The United States Government has certain rights in the invention.

FIELD

This disclosure relates to optical pulse position modulators, and in particular to pulse dispersion compensation for optical pulse position modulators.

BACKGROUND

Pulse position modulation (PPM) is a form of signal modulation in which the timing of pulses is modulated to transmit information. PPM is primarily useful for optical communications systems, where there tends to be little or no multipath interference, and particularly in vacuum where there is no refractive index dispersion.

In one prior art technique for generating an optical PPM signal, the pulse timing for each pulse is modulated in a waveguide channel with a linearly chirped Bragg grating built into the waveguide channel. The modulation shifts the pulse in time; however, the linearly chirped Bragg grating built into the waveguide channel also spreads or disperses the pulse in time. To remove the pulse dispersion some form of dispersion compensation must be performed. In the prior art the pulse dispersion has been performed using separate temperature-controlled devices such as fiber Bragg gratings (FBGs), dispersion compensating fiber, volume hologram chirped gratings or surface gratings. However it is difficult to fabricate a linear chirp grating in any of these separate devices that is identical to the grating which generated the chirped pulse. For example, nonuniformities in the glass used to fabricate the FBGs or volume holograms are difficult to avoid, which makes it difficult to fabricate FBGs or volume holograms with the required degree of accuracy. Temperature control helps, but adds bulk and still may not provide enough accuracy. Also sending the signal backward through the same grating could eliminate the dispersion but would simultaneously eliminate the PPM shift.

In addition, these prior art approaches do not address the issue of compensating for pulse dispersion while simultaneously allowing the position of the pulse to be modulated, as required for PPM signals.

What is needed is a system and method for accurate pulse dispersion compensation while allowing pulse position modulation to be maintained. A system and method for PPM is also needed which is compact enough for satellite applications. The embodiments of the present disclosure answer these and other needs.

SUMMARY

In a first embodiment disclosed herein, an optical pulse position modulator comprises a substrate having substantially parallel first and second sides, the substrate comprising a first waveguide channel orthogonal to the first and second sides; a second waveguide channel parallel to the first waveguide channel; a linear chirped grating orthogonal to and upon the first and second waveguide channels; and at least a first electrode along the first waveguide channel to apply a voltage modulation thereto; a first optical circulator having a first port, a second port and a third port, the first port coupled to a pulsed optical carrier signal, and the second port coupled to the first waveguide channel on the first side of the substrate; and a second optical circulator having a fourth port, a fifth port and a sixth port, the fourth port coupled to the third port of the first optical circulator, and the fifth port coupled to the second waveguide channel on the second side of the substrate.

In another embodiment disclosed herein, an optical pulse position modulator comprises a substrate having substantially parallel first and second sides; a first waveguide channel on the substrate, the first waveguide channel orthogonal to the first and second sides and having a first input and first output on the first side of the substrate; a second waveguide channel on the substrate parallel to the first waveguide channel, the second waveguide channel having a second input and a second output on the second side of the substrate, wherein the second input to the second waveguide channel at the second side is optically coupled to the first output of the first waveguide channel at the first side; a linear chirped grating on the first waveguide channel and the second waveguide channel, the linear chirped grating orthogonal to the first and second waveguide channels; and at least a first electrode along the first waveguide channel to apply a voltage modulation thereto.

In yet another embodiment disclosed herein, a method for providing an optical pulse position modulator comprises forming a substrate having substantially parallel first and second sides, the substrate comprising: a first waveguide channel orthogonal to the first and second sides; a second waveguide channel parallel to the first waveguide channel; a linear chirped grating on the substrate and orthogonal to the first and second waveguide channels; and at least a first electrode along the first waveguide channel; providing a first optical circulator having a first port, a second port and a third port, the first port coupled to a pulsed optical carrier signal, and the second port coupled to the first waveguide channel on the first side of the substrate; providing a second optical circulator having a fourth port, a fifth port and a sixth port, the fourth port coupled to the third port of the first optical circulator, and the fifth port coupled to the second waveguide channel on the second side of the substrate; applying a voltage to the at least first electrode to position modulate the pulsed optical carrier signal to produce a dispersed position modulated optical pulse signal which is coupled via the second, third, fourth and fifth ports to the second waveguide channel; and compressing the dispersed position modulated optical pulse signal in the second waveguide channel to produce a position modulated optical pulse signal at the sixth port on the second optical circulator.

In yet another embodiment disclosed herein, a method for pulse position modulation includes applying a pulsed optical carrier signal to a first waveguide channel having a first linear chirped grating, the first waveguide channel on a substrate, applying a voltage to at least a first electrode along the first waveguide channel to position modulate the pulsed optical carrier signal to produce a dispersed position modulated optical pulse signal, and applying the dispersed position modulated optical pulse signal to a second waveguide channel on the substrate, the second waveguide channel having a second linear chirped grating consistent with the first linear chirped grating to produce a position modulated optical pulse signal.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
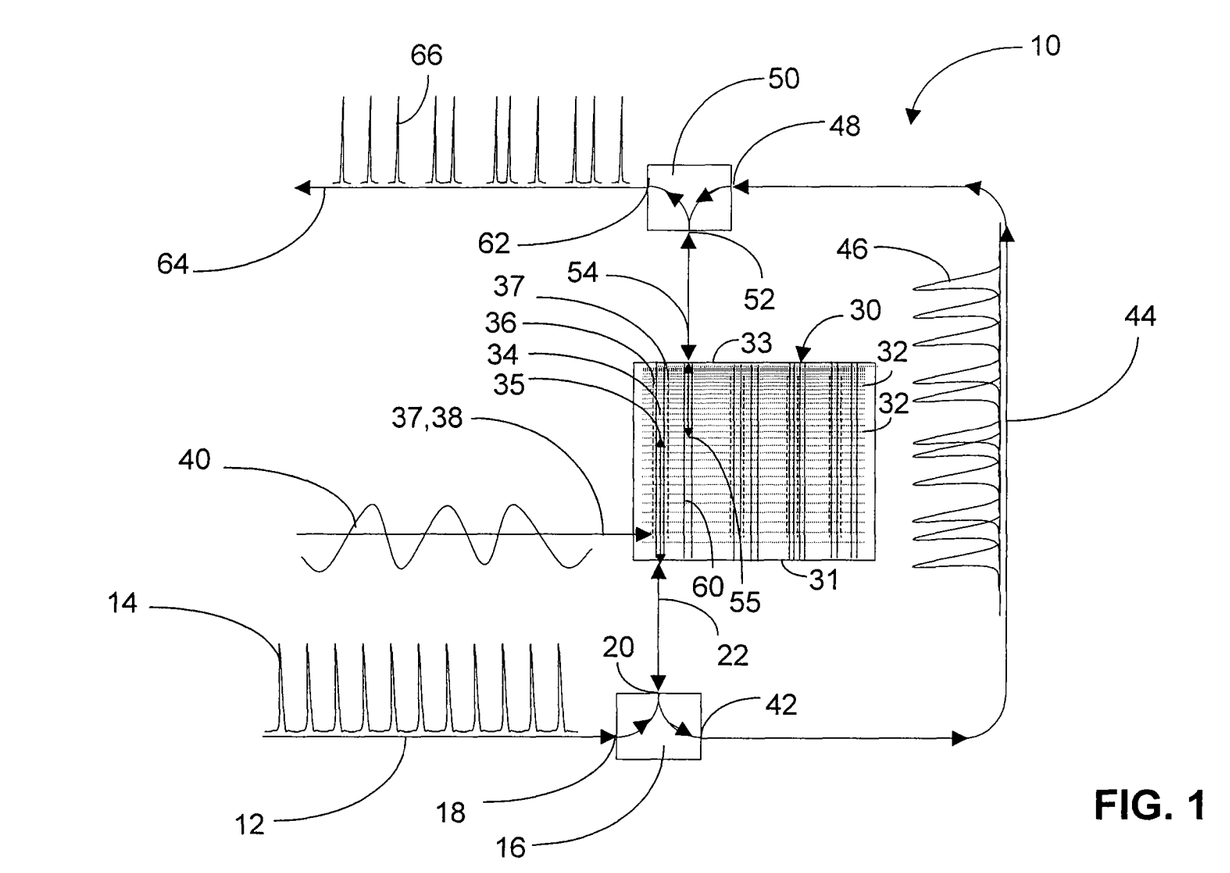
FIG. 1 is a diagram of a pulse position modulator in accordance with the present disclosure.

Referring to FIG. 1, a pulse position modulator 10 according to the present disclosure is shown. The pulse position modulator 10 includes a paired waveguide channel substrate 30, a first optical circulator 16, a second optical circulator 50 and various optical lines as described below. The inputs to the pulse position modulator 10 include a pulsed optical carrier signal 14 and an electrical modulation signal 40. The pulse position modulator 10 operates to generate a position modulated optical pulse signal 66.

Figure 2:
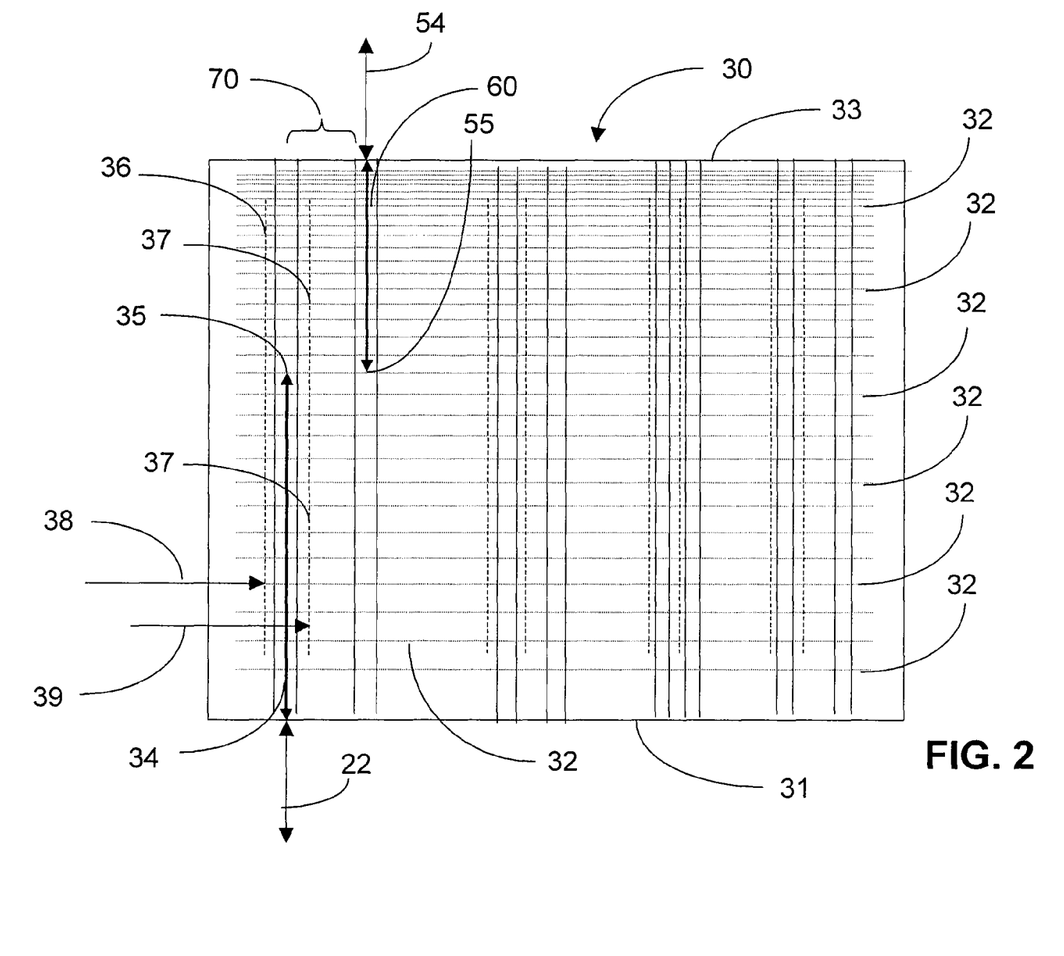
FIG. 2 is a diagram of a paired waveguide channel substrate in accordance with the present disclosure.

A detailed view of the paired waveguide channel substrate 30 is shown in FIG. 2. The paired waveguide channel substrate 30 may be made of lithium niobate (LiNbO$_3$) and has at least a first waveguide channel 34 paired with a second waveguide channel 60. The first waveguide channel 34 and the second waveguide channel 60 are formed on the substrate 30 by depositing and heating metal, such as titanium, in the area of the waveguide channels on the substrate 30. Upon being heated the metal diffuses into the substrate 30 forming a waveguide channel. The metal changes the index of refraction where the metal is deposited, which keeps the optical signals within the waveguide channels. It should be understood that a single paired waveguide channel substrate 30 may have multiple paired waveguides; however in the following only the first waveguide channel 34 paired with the second waveguide channel 60 are discussed.

The first waveguide channel 34 and the second waveguide channel 60 are essentially parallel to each other on the paired waveguide channel substrate 30. The paired waveguide channel substrate 30 has a first side 31 that is parallel to a second side 33. The first waveguide channel 34 and the second waveguide channel 60 may extend between the first side 31 and the second side 33 of the paired waveguide channel substrate 30. The separation 70 between the first waveguide channel 34 and the second waveguide channel 60 may be any distance as long as the linear chirped grating 32, discussed further below is substantially identical across both the first waveguide channel 34 and the second waveguide channel 60. When the first waveguide channel 34 and the second waveguide channel 60 are close together it is easier to form a substantially identical linear chirped grating 32 across them. In one embodiment the separation 70 between the first waveguide channel 34 and the second waveguide channel 60 may be about 50 microns.

A linear chirped grating 32 is formed on the paired waveguide channel substrate 30 between the first side 31 and the second side 33 orthogonal to the first waveguide channel 34 and the second waveguide channel 60. The linear chirped grating 32 has a linear chirped spacing because the spacing between adjacent gratings 32 in the linear chirped grating 32 decreases linearly from the first side 31 to the second side 33 of the paired waveguide channel substrate 30. The result is a reflectance in the waveguide that is linear with respect to wavelength. The linear chirped grating 32 may be formed, without limitation, by depositing photoresist, exposing the wafer to an optical interference pattern with a cylindrical focus difference between the interfering waves, developing the photoresist, and etching to create a relief pattern of ridges and valleys across the paired waveguide channel substrate 30. Other techniques to form gratings are known in the art and are not excluded by the foregoing description. The linear chirped grating 32 may be formed across the entire paired waveguide channel substrate 30; however, it should be understood that the linear chirped grating 32 may also be formed only within the area of the first waveguide channel 34 and the area of the second waveguide channel 60 rather than across the paired waveguide channel substrate 30. In either embodiment the gratings 32 in the linear chirped grating 32 in the second waveguide channel 60 need to be aligned with gratings 32 in the linear chirped grating 32 in the first waveguide channel 34. Equivalently, the requirement is for substantially identical reflectance as a function of wavelength in the first waveguide 34 and the second waveguide 60.

First electrode 36 and second electrode 37 may be each strips or planes that extend along the first waveguide channel 34, and are connected to electrical lines 38 and 39, respectively. In one embodiment, the second electrode is a ground plane and only the first electrode 36 is needed. The first and second electrode may also be implemented with separate planes that are on the top and bottom, or on the sides of the first waveguide channel 34. It is well understood in the art that there are many types of electrodes or voltage planes that may be used to induce an electric field in the first waveguide channel 34 and the present invention encompasses all of these types.

A voltage between the first and second electrodes 36, 37 induces an electric field in the first waveguide 34 that causes a change in the index of refraction of the waveguide 34 material and that causes a shift in the reflectance spectrum that provides pulse position modulation to optical pulses traveling in the first waveguide channel 34 as described below. The second waveguide channel 60 does not have any electrodes associated with it.

The first optical circulator 16 and the second optical circulator 50 are each three port devices that are well known in the prior art. Each circulator functions to direct an input signal on a first port to the output of a second port. Each circulator also functions to direct an input on the second port to the output of a third port.

The pulsed optical carrier signal 14 is inputted to a first port 18 on the first optical circulator 16 on a first optical line 12, which may be optical fiber or optical waveguide. The first optical circulator 16 operates to direct the pulsed optical carrier signal 14 from the first port 18 to a second port 20 on the first circulator 16. A second optical line 22, which may be optical fiber or optical waveguide, connects the second port 20 on the first circulator 16 to the first waveguide channel 34 on the first side 31 of the paired waveguide channel substrate 30.

The pulsed optical carrier signal 14 that enters the first waveguide channel 34 at side 31 of the paired waveguide channel substrate 30 propagates in the first waveguide channel 34 to a variable first location 35 dependent on the applied electric field, shown in better detail in FIG. 2. At the first location 35 the pulsed optical carrier signal 14 is reflected and propagates in a reverse direction in the first waveguide channel 34 back towards side 31 of the paired waveguide channel substrate 30.

If no voltage modulation is applied across first and second electrodes 36 and 37, then the first location 35 is at the position in the first waveguide channel at which the spacing between adjacent gratings in the linear chirped grating 32 is $\lambda/2n$, where $\lambda$ is the wavelength of the pulse optical carrier signal 14 and n is the index of refraction of the first waveguide channel 34. If voltage modulation is applied across first and second electrodes 36 and 37 via electrical lines 38 and 39, respectively, then the index of refraction n of the first waveguide channel is varied by the induced electric field. Thus, because the first location 35 is a function of the index of refraction n, the position of the first location 35 at which the pulsed optical carrier signal 14 is reflected varies, which modulates the positions of pulses in the pulse optical carrier signal 14, because the length of travel in the first waveguide channel varies due to the voltage modulation.

Also as each optical pulse 14 of the pulsed optical carrier signal 14 travels in the first waveguide channel 34, each optical pulse is dispersed or spread in time by the linear chirped grating 32 in the first waveguide channel 34. The result is a dispersed position modulated optical pulse signal 46.

The dispersed position modulated optical pulse signal 46 is transmitted from the first waveguide channel 34 on side 31 to the input of second port 20 on the first circulator 16 via the second optical line 22. The first circulator 16 operates to direct the dispersed position modulated optical pulse signal 46 from the second port 20 to the third port 42 on the first optical circular 16, which is connected to a third optical line 44, which may be an optical fiber or an optical waveguide.

The third optical line 44 is connected to input of the first port 48 on the second optical circulator 50. The second optical circulator 50 operates to direct the dispersed position modulated optical pulse signal 46 from the first port 48 to the second port 52 on the second optical circulator 50. The second port 52 on the second optical circulator 50 is connected by fourth optical line 54 to the second channel 60 on side 33 of the paired waveguide channel substrate 30. As discussed above, the linear chirped grating 32 has a linear chirped spacing which decreases linearly from the first side 31 to the second side 33 of the paired waveguide channel substrate 30. Thus, while the second optical line 22 is connected to the first waveguide channel 34 at side 31 with the widest linear chirped grating 32 spacing, which causes dispersion of the pulsed optical carrier signal 14, the fourth optical line 54 is connected to the second waveguide channel 60 at side 33 with the narrowest linear chirped grating 32 spacing, which causes compression of the dispersed position modulated optical pulse signal 46 as it propagates in the second waveguide channel 60 to generate the position modulated optical pulse signal 66.

The dispersed position modulated optical pulse signal 46 that enters the second waveguide channel 60 at side 33 of the paired waveguide channel substrate 30 propagates in the second waveguide channel 60 to the second location 55, shown in detail in FIG. 2. At the second location 55 the dispersed position modulated optical pulse signal 46 is reflected and propagates in a reverse direction in the second waveguide channel 60 back towards side 33 of the paired waveguide channel substrate 30. The second location 55 is at the position in the second waveguide channel 60 at which the spacing of the linear chirped grating 32 is $\lambda/2n$, where $\lambda$ is the wavelength of the dispersed position modulated optical pulse signal 46 and n is the index of refraction of the second waveguide channel 60. Because the index of refraction in the second waveguide channel 60 is not modulated, the modulation in the dispersed position modulated optical pulse signal 46 is preserved while the dispersed position modulated optical pulse signal 46 is compressed to generate the position modulated optical pulse signal 66.

The position modulated optical pulse signal 66 is transmitted from the second waveguide channel 60 on side 33 of the paired waveguide channel substrate 30 to the input of the second port 52 on the second circulator 50 via the fourth optical line 54. The second circulator 50 operates to direct the position modulated optical pulse signal 66 from the second port 52 to the third port 62 on the second optical circular 50, which is connected to a fifth optical line 64, which may be an optical fiber or an optical waveguide.

In a preferred embodiment the first, second, third, fourth and fifth optical lines are single polarization fiber or polarization maintaining optical fiber.

Figure 3:
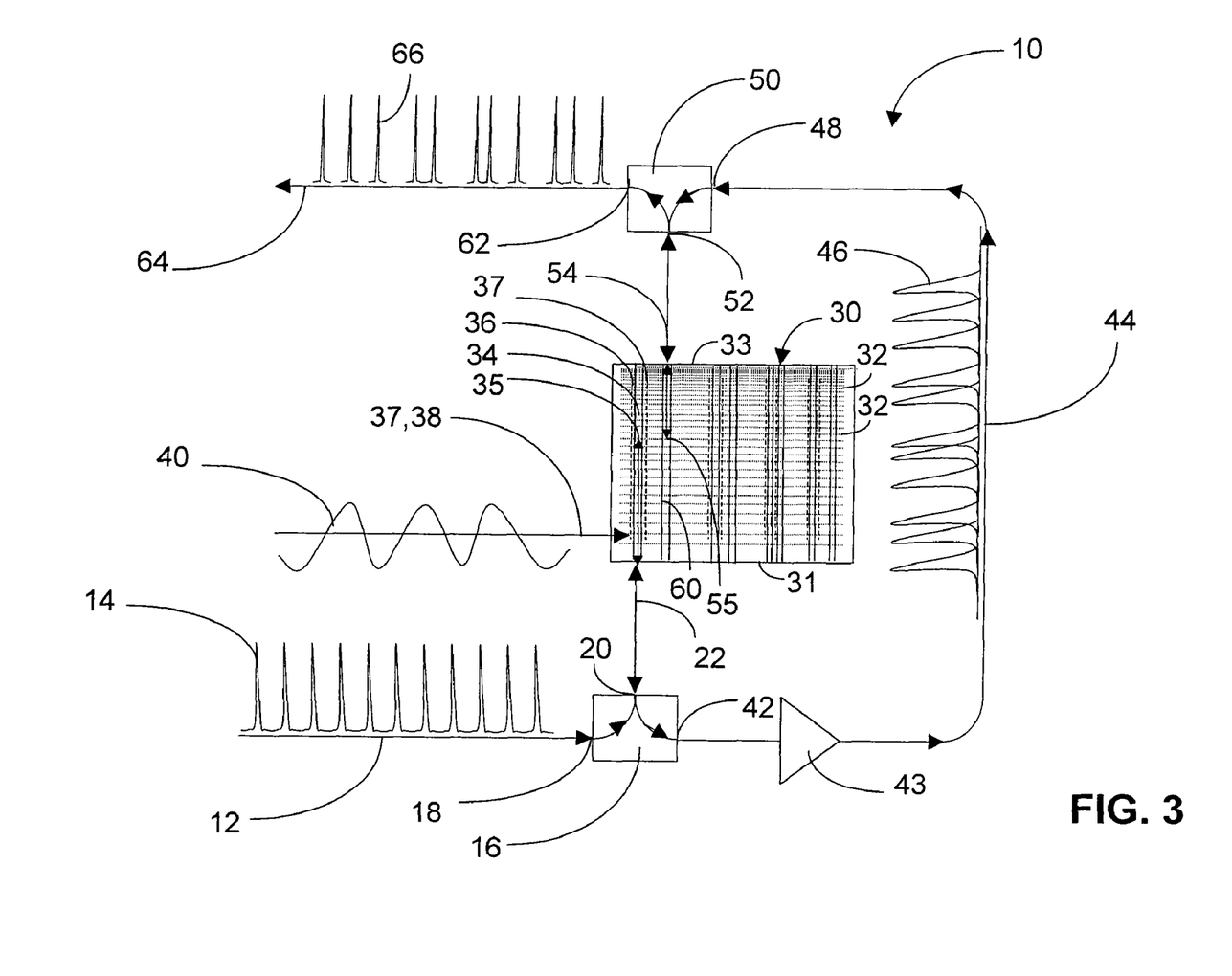
FIG. 3 is another diagram of a pulse position modulator in accordance with the present disclosure.

In another embodiment shown in FIG. 3, an amplifier 43 is connected between the output of the third port 42 of the first optical circulator 16 and the first port 48 of the second optical circulator 50 to amplify the dispersed position modulated optical pulse signal 46 to compensate for any signal losses in the first waveguide channel 34. The amplifier 43 may be a polarization maintaining erbium doped fiber amplifier.

Figure 4A:
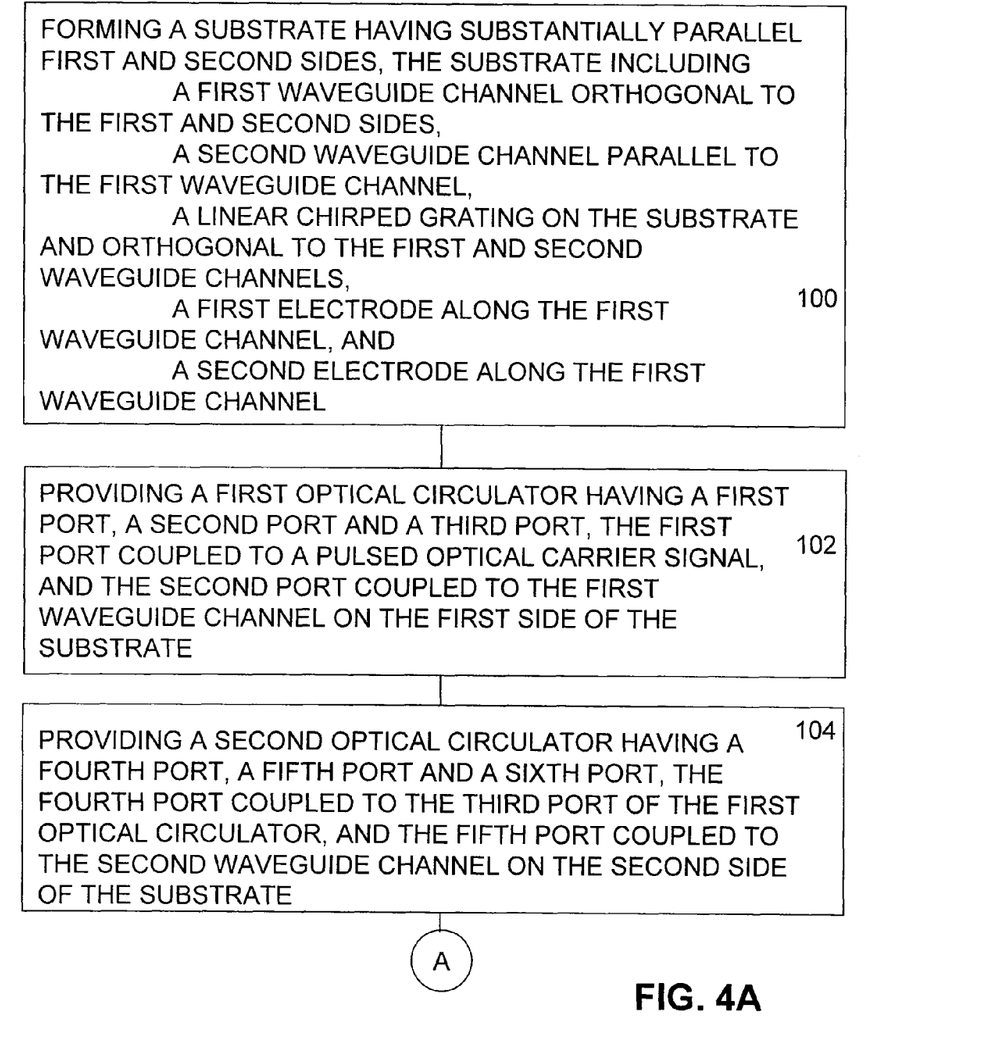
FIGS. 4A and 4B are flow diagrams of a method for providing an optical pulse position modulator in accordance with the present disclosure.
Figure 4B:
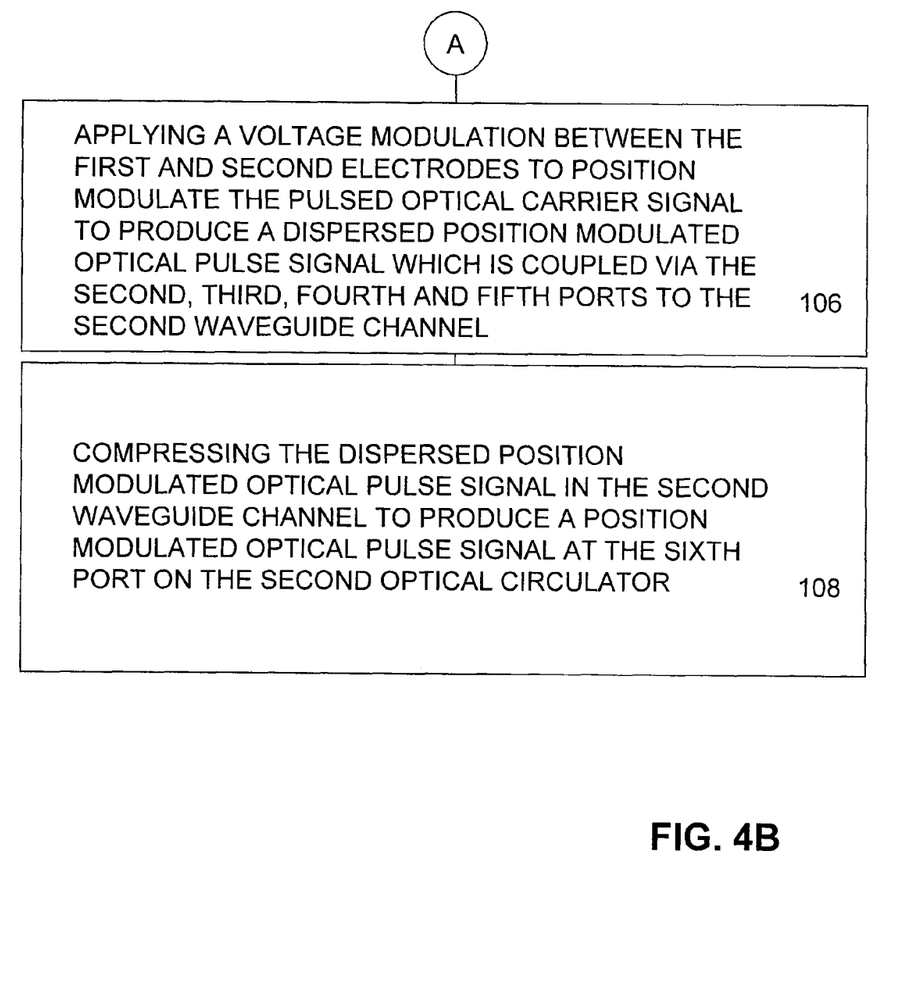

FIGS. 4A and 4B are flow diagrams of a method for providing an optical pulse position modulator 10. In step 100 a substrate 30 is formed having substantially parallel first 31 and second 33 sides. The substrate 30 includes a first waveguide channel 34 orthogonal to the first and second sides 31, 33, a second waveguide channel 60 parallel to the first waveguide channel 34, a linear chirped grating 32 on the substrate 30 orthogonal to the first and second waveguide channels, a first electrode 36 along the first waveguide channel 34, and a second electrode 37 along the first waveguide channel 34. In step 102 a first optical circulator 16 is provided having a first port 18, a second port 20 and a third port 42, the first port 18 coupled to a pulsed optical carrier signal 14, and the second port 20 coupled to the first waveguide channel 34 on the first side 31 of the substrate 30. In step 104 a second optical circulator 50 is provided having a fourth port 48, a fifth port 52 and a sixth port 62, the fourth port 48 coupled to the third port 42 of the first optical circulator 16, and the fifth port 52 coupled to the second waveguide channel 60 on the second side 33 of the substrate 30. In step 106 a voltage modulation 40 is applied between the first 36 and second 37 electrodes to position modulate the pulsed optical carrier signal 14 to produce a dispersed position modulated optical pulse signal 46 which is coupled via the second 20, third 42, fourth 48 and fifth 52 ports to the second waveguide channel 60. Finally in step 108 the dispersed position modulated optical pulse signal 46 is compressed in the second waveguide channel 60 to produce a position modulated optical pulse signal 66 at the sixth port 62 on the second optical circulator 50.

Figure 5:
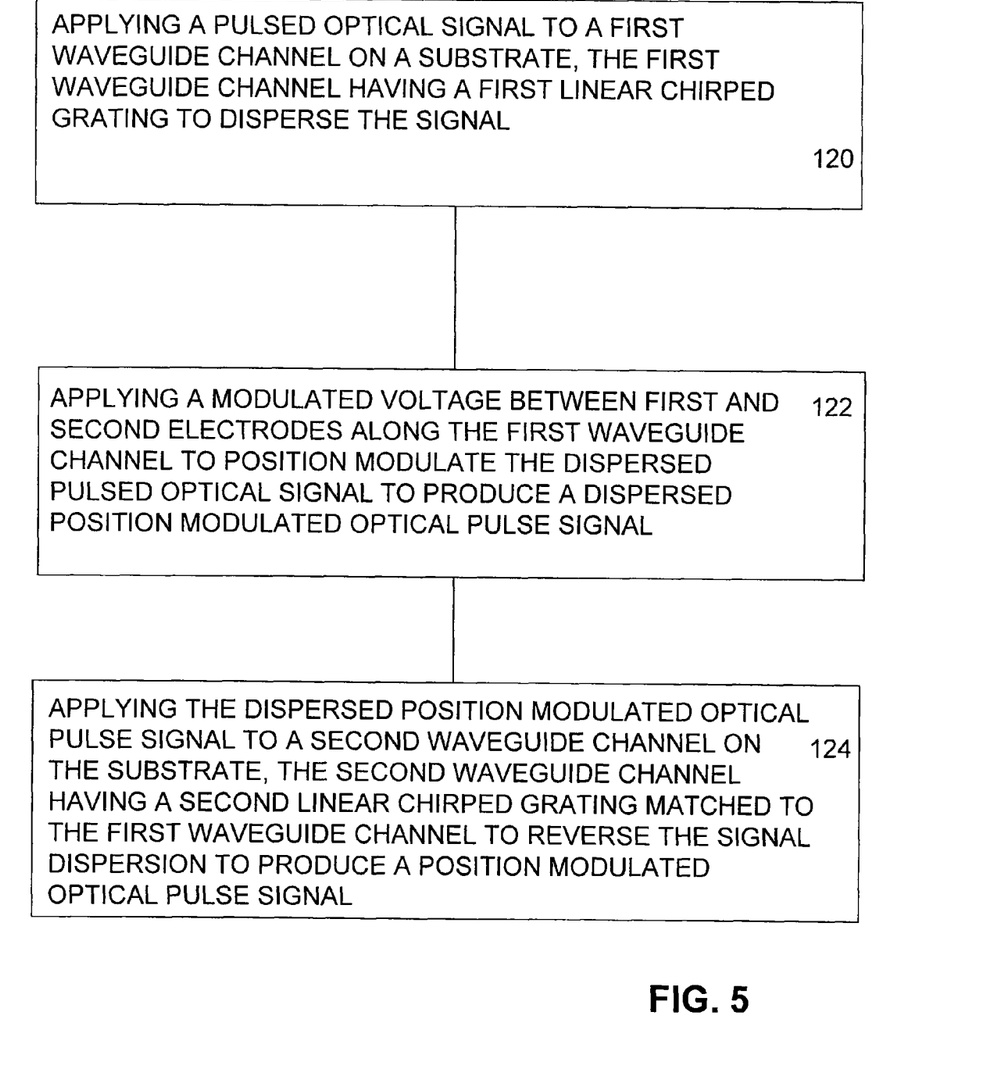
FIG. 5 is a flow diagram of a method for performing optical pulse position modulation in accordance with the present disclosure.

FIG. 5 is a flow diagram for performing pulse position modulation. In step 120 a pulsed optical carrier signal 14 is applied to a first waveguide channel 34 having a first linear chirped grating 32. The first waveguide channel is on the substrate 30. In step 122 a voltage is applied between first and second electrodes 36, 37 along the first waveguide channel 34 to position modulate the pulsed optical carrier signal 14 to produce a dispersed position modulated optical pulse signal 46. Then in step 124 the dispersed position modulated optical pulse signal 46 is applied to a second waveguide channel 60 on the substrate 30. The second waveguide channel 60 has a second linear chirped grating 32 consistent with the first linear chirped grating 32. The result is a position modulated optical pulse signal.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "comprising the step(s) of . . . ."

What is claimed is:

1. An optical pulse position modulator comprising:
 a substrate having substantially parallel first and second sides comprising:
  a first waveguide channel;
  a second waveguide channel substantially parallel to the first waveguide channel;
  a linear chirped grating within the first and second waveguide channels; and
  at least a first electrode along the first waveguide channel to apply a modulation voltage thereto;
 a first optical circulator having a first port, a second port and a third port, the first port coupled to a pulsed optical carrier signal, and the second port coupled to the first waveguide channel on the first side of the substrate; and
 a second optical circulator having a fourth port, a fifth port and a sixth port, the fourth port coupled to the third port of the first optical circulator, and the fifth port coupled to the second waveguide channel on the second side of the substrate.

2. The optical pulse position modulator of claim 1 wherein the substrate comprises $LiNbO_3$.

3. The optical pulse position modulator of claim 1 wherein the linear chirped grating on the substrate comprises:
 a first linear chirped grating on the first waveguide channel, the first linear chirped grating; and
 a second linear chirped grating on the second waveguide channel, the second linear chirped grating substantially identical to the first linear chirped grating in the first waveguide channel.

4. The optical pulse position modulator of claim 1 wherein:
 a separation between the first waveguide channel and the second waveguide channel on the substrate is approximately 50 microns.

5. The optical pulse position modulator of claim 1 further comprising:
 a first optical line coupled to the first port;
 a second optical line coupled between the second port and the first waveguide channel on the first side of the substrate;
 a third optical line coupled between the third port and the fourth port;
 a fourth optical line coupled between the fifth port and the second waveguide channel on the second side of the substrate; and
 a fifth optical line coupled to the sixth port.

6. The optical pulse position modulator of claim 5 wherein:
 each of the first, second, third, fourth and fifth optical lines comprises single polarization fiber or polarization maintaining fiber.

7. The optical pulse position modulator of claim 1 wherein a spacing between adjacent grates in the linear chirped grating decreases linearly from the first side to the second side of the substrate.

8. The optical pulse position modulator of claim 1 wherein:
 a spacing between adjacent grates in the linear chirped grating comprises a spacing between a pair of adjacent grates of approximately $\lambda/2n$, wherein $\lambda$ is the wavelength of the pulse optical carrier signal and n is the index of refraction of the first waveguide channel.

9. The optical pulse position modulator of claim 1 further comprising a second electrode along the first waveguide channel to apply a modulation voltage thereto.

10. The optical pulse position modulator of claim 9 wherein the second electrode is a ground plane.

11. The optical pulse position modulator of claim 1 wherein:
 the first waveguide channel comprises $LiNbO_3$ doped with a metal; and the second waveguide channel comprises $LiNbO_3$ doped with the metal.

12. The optical pulse position modulator of claim 11 wherein the metal is titanium.

13. The optical pulse position modulator of claim 1 wherein an index of refraction of the first waveguide channel is modulated by the modulation voltage applied by the first electrode.

14. The optical pulse position modulator of claim 1 further comprising an amplifier coupled between the third port of the first optical circulator and the fourth port of the second optical circulator.

15. An optical pulse position modulator comprising:
 a substrate having substantially parallel first and second sides;

a first waveguide channel on the substrate, the first waveguide channel having a first input and first output on the first side of the substrate;

a second waveguide channel on the substrate substantially parallel to the first waveguide channel, the second waveguide channel having a second input and a second output on the second side of the substrate, wherein the second input to the second waveguide channel at the second side is optically coupled to the first output of the first waveguide channel at the first side;

a linear chirped grating on the first waveguide channel and the second waveguide channel; and at least a first electrode along the first waveguide channel to apply a voltage modulation thereto.

16. The optical pulse position modulator of claim 15 wherein the substrate comprises $LiNbO_3$.

17. The optical pulse position modulator of claim 15 wherein the linear chirped grating on the substrate comprises:

a first linear chirped grating on the first waveguide channel; and a second linear chirped grating on the second waveguide channel, the second linear chirped grating substantially identical to the first linear chirped grating in the first waveguide channel.

18. The optical pulse position modulator of claim 15 wherein a spacing between adjacent grates in the linear chirped grating decreases linearly from the first side to the second side of the substrate.

19. The optical pulse position modulator of claim 15 wherein:

a spacing between adjacent grates in the linear chirped grating comprises a spacing between a pair of adjacent grates of approximately $\lambda/2n$, wherein $\lambda$ is the wavelength of the pulse optical carrier signal and n is the index of refraction of the first waveguide channel.

20. The optical pulse position modulator of claim 15 further comprising a second electrode along the first waveguide channel to apply a modulation voltage thereto.

21. The optical pulse position modulator of claim 20 wherein the second electrode is a ground plane.

22. The optical pulse position modulator of claim 15 wherein:

the first waveguide channel comprises $LiNbO_3$ doped with a metal; and the second waveguide channel comprises $LiNbO_3$ doped with the metal.

23. The optical pulse position modulator of claim 22 wherein the metal is titanium.

24. The optical pulse position modulator of claim 15 wherein an index of refraction of the first waveguide channel is modulated by the modulation voltage applied by the first electrode.

25. The optical pulse position modulator of claim 15 wherein the linear chirped grating on the first waveguide channel and the second waveguide channel comprises a linear chirped grating extending from the first side to the second side of the substrate.

26. The optical pulse position modulator of claim 15 further comprising an amplifier coupled between the first output of the first waveguide channel and the second input of the second waveguide channel.

27. A method for providing an optical pulse position modulator comprising:

forming a substrate having substantially parallel first and second sides, the substrate comprising:
a first waveguide channel;
a second waveguide channel parallel to the first waveguide channel;
a linear chirped grating upon the first and second waveguide channels; and
at least a first electrode along the first waveguide channel;

providing a first optical circulator having a first port, a second port and a third port, the first port coupled to a pulsed optical carrier signal, and the second port coupled to the first waveguide channel on the first side of the substrate;

providing a second optical circulator having a fourth port, a fifth port and a sixth port, the fourth port coupled to the third port of the first optical circulator, and the fifth port coupled to the second waveguide channel on the second side of the substrate;

applying a voltage to the at least first electrode to position modulate the pulsed optical carrier signal to produce a dispersed position modulated optical pulse signal which is coupled via the second, third, fourth and fifth ports to the second waveguide channel; and compressing the dispersed position modulated optical pulse signal in the second waveguide channel to produce a position modulated optical pulse signal at the sixth port on the second optical circulator.

28. A method for performing optical pulse position modulation comprising:

applying a pulsed optical carrier signal in a first direction to a first waveguide channel having a first linear chirped grating, the first waveguide channel on a substrate;

applying a voltage to at least a first electrode along the first waveguide channel to position modulate the pulsed optical carrier signal to produce a dispersed position modulated optical pulse signal; and applying the dispersed position modulated optical pulse signal in the opposite direction to a second waveguide channel on the substrate, the second waveguide channel having a second linear chirped grating consistent with the first linear chirped grating to produce a compressed spectrum optical pulse signal.

\* \* \* \* \*